US012555929B2

United States Patent
(12) United States Patent
Mao et al.

(10) Patent No.: US 12,555,929 B2
(45) Date of Patent: Feb. 17, 2026

(54) DUAL MODE CLOAKING BASE STATION ANTENNA SYSTEM USING FREQUENCY SELECTIVE SURFACES

(71) Applicants: Yilin Mao, San Jose, CA (US); Peter Chun Teck Song, San Jose, CA (US); Karl Ni, Rochester, NY (US); Vipin Cholleti, San Jose, CA (US); David Edwin Barker, Stockport (GB)

(72) Inventors: Yilin Mao, San Jose, CA (US); Peter Chun Teck Song, San Jose, CA (US); Karl Ni, Rochester, NY (US); Vipin Cholleti, San Jose, CA (US); David Edwin Barker, Stockport (GB)

(73) Assignee: Quintel Cayman Limited, Grand Cayman (KY)

( * ) Notice: Subject to any disclaimer, the term of this patent is extended or adjusted under 35 U.S.C. 154(b) by 177 days.

(21) Appl. No.: 18/349,908

(22) Filed: Jul. 10, 2023

(65) Prior Publication Data

US 2024/0014578 A1 Jan. 11, 2024

Related U.S. Application Data

(60) Provisional application No. 63/388,008, filed on Jul. 11, 2022.

(51) Int. Cl.

| | |
|---|---|
| ***H01Q 25/00*** | (2006.01) |
| ***H01Q 1/24*** | (2006.01) |
| ***H01Q 5/30*** | (2015.01) |

(52) U.S. Cl.

CPC .......... *H01Q 25/001* (2013.01); *H01Q 1/246* (2013.01); *H01Q 5/30* (2015.01)

(58) Field of Classification Search

CPC .......... H01Q 15/0006; H01Q 15/0013; H01Q 15/0026; H01Q 15/004; H01Q 5/20; H01Q 5/30; H01Q 25/001; H01Q 21/062; H01Q 21/24; H01Q 1/246

See application file for complete search history.

(56) References Cited

U.S. PATENT DOCUMENTS 7,557,768 B2 * 7/2009 Baliarda ................ H01Q 1/246 343/844
10,498,035 B2 * 12/2019 Isik .......................... H01Q 9/16
(Continued)

OTHER PUBLICATIONS

International Search Report and Written Opinion, International Application No. PCT/US23/69906, Oct. 11, 2023, 15 pages.

*Primary Examiner* — Jason M Crawford

(57) ABSTRACT

A multi-band antenna may include a first antenna array for operation in a first frequency range and a second antenna array for operation in a second frequency range that is higher than the first frequency range. The first antenna array may include at least one antenna element having a plurality of components, where at least one of the plurality of components is constructed with a frequency selective surface (FSS) comprising a plurality of FSS elements. The FSS may be configured for the at least one of the plurality of components to provide a rejection of a coupling of energy from the second frequency range, and for the at least one of the plurality of components to provide a transmission of signals in the first frequency range suitable for use in a cellular communication system.

23 Claims, 10 Drawing Sheets

(56) References Cited

U.S. PATENT DOCUMENTS

| | | | | |
|---|---|---|---|---|
| 2008/0204355 | A1* | 8/2008 | Cahill | H01Q 15/004 343/909 |
| 2009/0091508 | A1 | 4/2009 | Fabrega-Sanchez et al. | |
| 2013/0201068 | A1* | 8/2013 | Alexopoulos | H01Q 19/10 343/834 |
| 2014/0002326 | A1* | 1/2014 | Puente | H01Q 21/08 343/893 |
| 2017/0317420 | A1* | 11/2017 | Farzaneh | H01Q 1/246 |
| 2019/0123426 | A1* | 4/2019 | Bryce | H01Q 21/28 |
| 2019/0393597 | A1* | 12/2019 | Kosaka | H01Q 15/14 |
| 2020/0076079 | A1* | 3/2020 | Shan | H01Q 15/14 |
| 2020/0312686 | A1 | 10/2020 | Kawai et al. | |
| 2021/0305684 | A1 | 9/2021 | Hou et al. | |
| 2021/0305717 | A1* | 9/2021 | Hou | H01Q 19/185 |
| 2021/0305718 | A1* | 9/2021 | Li | H01Q 5/48 |
| 2021/0320409 | A1* | 10/2021 | Luo | H01Q 19/10 |
| 2021/0391647 | A1* | 12/2021 | Guo | H01Q 5/42 |
| 2022/0278462 | A1* | 9/2022 | Guo | H01Q 1/52 |
| 2022/0320716 | A1* | 10/2022 | Zhang | H01Q 15/0013 |
| 2023/0104131 | A1* | 4/2023 | Varnoosfaderani | H01Q 21/062 343/702 |
| 2023/0395987 | A1* | 12/2023 | Li | H01Q 1/246 |
| 2024/0006777 | A1* | 1/2024 | Li | H01Q 21/062 |
| 2024/0014578 | A1* | 1/2024 | Mao | H01Q 5/30 |
| 2024/0186711 | A1* | 6/2024 | Li | H01Q 5/45 |
| 2024/0195081 | A1* | 6/2024 | Wu | H01Q 21/062 |
| 2024/0250446 | A1* | 7/2024 | Hojat | H01Q 1/48 |
| 2024/0388009 | A1* | 11/2024 | Bunga | H01Q 1/246 |
| 2025/0149804 | A1* | 5/2025 | Wong | H01Q 21/26 |

* cited by examiner

DUAL MODE CLOAKING BASE STATION ANTENNA SYSTEM USING FREQUENCY SELECTIVE SURFACES

CROSS-REFERENCE TO RELATED APPLICATIONS

This application claims priority to U.S. Provisional Patent Application Ser. No. 63/388,008, filed Jul. 11, 2022, which is herein incorporated by reference in its entirety.

FIELD OF THE DISCLOSURE

The present disclosure relates generally to cellular base station antennas, and relates more particularly to antenna systems having antenna elements with frequency selective surfaces.

BACKGROUND

The desire for mobile telecommunication services with higher data rates and greater connectivity has driven the rapid recent progress and development of 5th Generation (5G) mobile networks. More and more spectrum bands have been issued in recent years and allocated for mobile telecommunication services, including spectrum bands in the increasingly popular 3300-4200 MHz, or C-Band range for 5G services. Operators are not only working towards enabling new technologies for 5G infrastructure, but are also working in parallel to ensure continued operation and support for existing or other legacy communication systems. A base station antenna (BSA) may comprise an array of antenna elements to form a directed radiation pattern to deliver a desired radio frequency (RF) coverage. As multiple frequency spectrum bands may be supported, new BSA solutions to support new spectrum bands may also be called for. Simply adding new antennas at base station sites to support new spectrum bands may not be feasible due to zoning issues, installation tower or structural dead load and wind load capabilities, and cost of site rentals.

Up until 5G, most BSA's could support a low-band range of frequencies (such as 698-960 MHz) with at least one cross-polarized array of antenna elements and support a mid-band range of frequencies (such as 1695-2690 MHz) with at least a second cross-polarized array of antenna elements. For instance, one arrangement may include two low-band arrays and two or more mid-band arrays co-located or sharing the same physical multi-antenna array or BSA package. The multiple arrays in each band permit multi-antenna, permit multiple input multiple output (MIMO) processing, or support different proximate spectrum bands within the bandwidth of the array. Low-band and mid-band antenna arrays can be positioned and arranged in several ways including the interleaving of low-band and mid-band elements to optimize the packing density of the BSA and minimise the risks of low-band-element-to-mid-band-element shadowing and mutual obstructions.

SUMMARY

In one example, the present disclosure describes a multi-band antenna that may include a first antenna array for operation in a first frequency range and a second antenna array for operation in a second frequency range that is higher than the first frequency range. The first antenna array may include at least one antenna element having a plurality of components, where at least one of the plurality of components is constructed with a frequency selective surface (FSS) comprising a plurality of FSS elements. The FSS may be configured for the at least one of the plurality of components to provide a rejection of a coupling of energy from the second frequency range, and for the at least one of the plurality of components to provide a transmission of signals in the first frequency range suitable for use in a cellular communication system.

In another example, the present disclosure describes a multi-band antenna that may include a first antenna array for operation in a first frequency range and a second antenna array for operation in a second frequency range that is higher than the first frequency range. The first antenna array may include at least one antenna element having a plurality of components, where at least one of the plurality of components is constructed with a frequency selective surface (FSS) comprising a plurality of FSS elements. The FSS may be configured for the at least one of the plurality of components to provide a resonance wavelength in the second frequency range, and for the at least one of the plurality of components to provide a transmission of signals in the first frequency range suitable for use in a cellular communication system.

In still another example, the present disclosure describes a multi-band antenna that may include a first antenna array for operation in a first frequency range, a second antenna array for operation in a second frequency range that is higher than the first frequency range, and a third antenna array for operation in a third frequency range that is higher than the second frequency range. The first antenna array may include at least one antenna element having a plurality of components, where at least one of the plurality of components is constructed with a frequency selective surface (FSS) comprising a plurality of FSS elements. The FSS may be configured for the at least one of the plurality of components to provide a rejection of a coupling of energy from the second frequency range, for the at least one of the plurality of components to provide a resonance wavelength in the third frequency range, and for the at least one of the plurality of components to provide a transmission of signals in the first frequency range suitable for use in a cellular communication system.

BRIEF DESCRIPTION OF THE DRAWINGS

The teachings of the present disclosure can be readily understood by considering the following detailed description in conjunction with the accompanying drawings, in which:

FIG. 2(*b*) depicts example azimuth radiation patterns for the mid-band antenna elements of FIG. 2(*a*) without the presence of the low-band antenna element;

FIG. 2(*c*) depicts example azimuth radiation patterns for the mid-band antenna elements of FIG. 2(*a*) with the presence of the low-band antenna element;

FIG. 3(*b*) depicts an example graph of transmissivity response of a plane wave incident on FSS element for two different tuned FSS elements;

FIG. 4(*b*) depicts an example graph of transmissivity response for a dipole arm represented as a transmission line using an FSS tuned for efficient transmission at low-band;

FIG. 5(*b*) depicts example azimuthal radiation patterns for the C-band antenna element of FIG. 5(*a*) with the presence of the low-band dipole arm;

FIG. 6(*b*) depicts example azimuthal radiation patterns for the C-band antenna element of FIG. 6(*a*) with the presence of the low-band dipole arm comprising the FSS;

FIG. 7(*b*) depicts example azimuthal radiation patterns for the mid-band antenna element of FIG. 7(*a*) with the presence of the low-band dipole arm;

FIG. 8(*b*) depicts example azimuthal radiation patterns for the mid-band antenna element of FIG. 8(*a*) with the presence of the low-band dipole arm comprising the FSS;

FIG. 9(*b*) depicts example azimuthal radiation patterns for the mid-band antenna element of FIG. 9(*a*) with the presence of the low-band antenna element balun network (but without its dipole arm(s));

FIG. 10(*b*) depicts example azimuthal radiation patterns for the mid-band antenna element of FIG. 10(*a*) with the presence of the low-band antenna element balun network having a defective ground plane comprising a tuned FSS/array (but without its dipole arm(s)).

To facilitate understanding, identical reference numerals have been used, where possible, to designate identical elements that are common to the figures.

DETAILED DESCRIPTION

Figure 1:
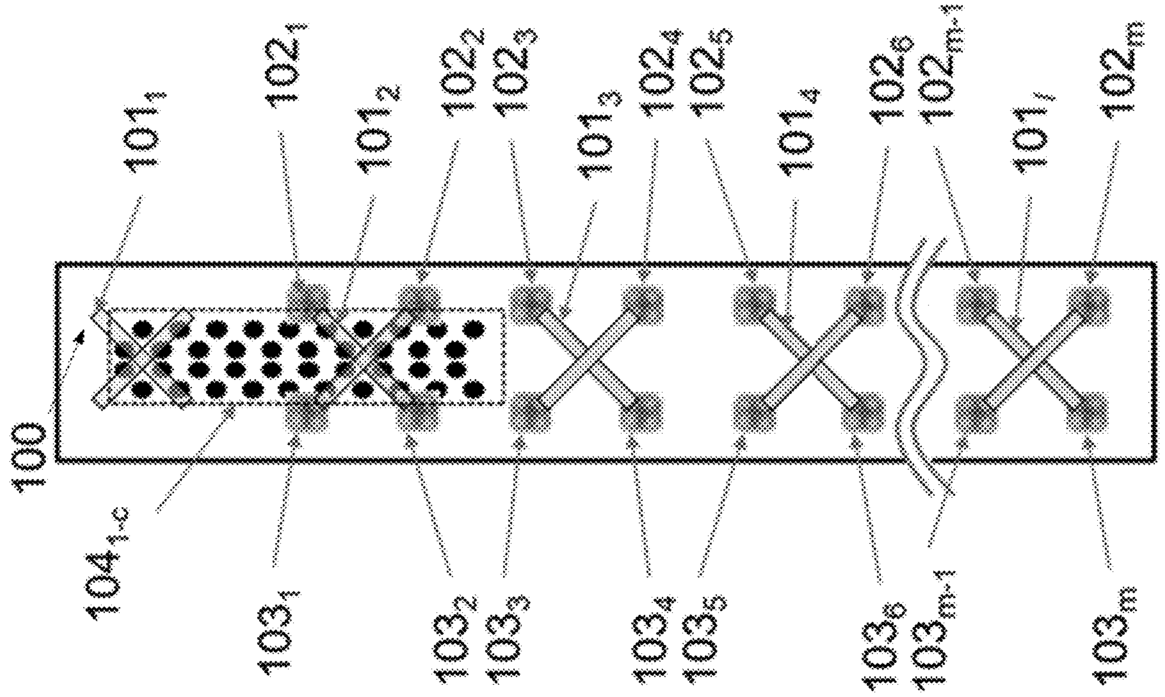
FIG. 1 depicts an example base station antenna with multiple cross-polarized antenna arrays serving three different frequency bands.

Examples of the present disclosure describe apparatuses and methods for minimizing unintended induced currents in cellular antenna arrays using a frequency selective structure (FSS). For instance, in one example, the present disclosure provides a first cloaking mode whereby a larger antenna element operating at a lower frequency obscuring a smaller antenna element operating at a particular higher frequency band appears to be electromagnetically transparent. This configuration minimizes disturbance to a desired radiation pattern of the higher frequency antenna element caused by shadowing effects from the lower frequency antenna element. In one example, the FSS structures are implemented on the radiating components such as the dipole arms, parasitic radiators, and any balun networks to provide the desired RF transparency. In one example, the present disclosure provides a second filtering mode whereby the tessellation of FSS elements on the lower frequency antenna element enable an efficient low-pass function for the transmission and radiation of the lower frequency, while also attenuating induced currents from higher frequencies. Notably, many typical FSS structures are designed to resonate at their cloaking mode frequency using FSS elements with closed or opened loop resonator features. However, in one example, the present disclosure may provide a combination of closed and open loop features, enabling FSS element size reduction for practical implementation onto a larger antenna element. This FSS element size reduction offers further design freedoms for the arrangement of FSS elements or periods as to enable the second filtering mode. Accordingly, in one example, the FSS elements therefore offer a dual mode cloaking technique, one of which is a resultant of the FSS while the other is a derivative of the overall finite FSS structure.

As 5G has emerged in the C-Band range of frequencies (3300-4200 MHz), there is a desire to include additional antenna arrays, co-located with low-band and mid-band antenna arrays, in the same or similar BSA form factor. This allows BSA antennas to be swapped out and upgraded to support C-Band spectrum at existing cellular base station sites with minimal impact to zoning, tower loading, and performance to existing cellular services. C-band arrays are designed for time division duplex (TDD) operation and can exploit beamforming features. Such beamforming for cellular systems may demand at least four cross-polarized column arrays of antenna elements, with each column array separated by around half wavelength for optimized operation. Adding four cross-polar C-band arrays to a BSA with multiple low-band and mid-band array structures while maintaining the same overall BSA form factor and minimizing performance degradation becomes challenging. Co-located antenna arrays operating at multiple frequency ratios are packed much more closely with increased mutual coupling and increased array-to-array blocking or shadowing. This blocking or shadowing effect may result in disturbances to the radiation patterns, thus affecting the coverage of the network.

FIG. 1 illustrates one challenge of co-locating arrays for different frequency ranges within a limited space. FIG. 1 depicts the construction of a multi-band BSA (100) comprising a first planar array of/dual-polarized antenna elements ($101_1$-$101_l$) for operation in a first range of frequencies, for example a low-band range of frequencies. There is a second planar array comprising two column arrays each of m dual-polarized antenna elements ($102_1$-$102_m$ and $103_1$-$103_m$), where the second array is designed for operation in a second range of spectra, for example a mid-band range of spectra, and is positioned underneath the plane of the first planar array of antenna elements. A third array of dual-polarized antenna elements (104) is shown, for operation in a third range of frequencies, such as a C-band range of frequencies, and is positioned below the plane of the second planar array. The third array may have antenna element spacing optimized for beamforming operation in a horizontal or azimuthal plane.

Most base station cellular antennas exploit dual-polarized antenna arrays comprising dual-polarized antenna elements. Such dual-polarized antenna elements may be composed of two single or uni-polarized antenna elements having orthogonal polarizations and typically are co-located with each other, thereby providing additional antenna arrays for no or negligible increase in physical size. It should be noted that the present disclosure may use the term "antenna element" to refer to both single-polarized antenna elements and dual-polarized antenna elements.

Referring to the example of FIG. 1, a first problem may be the presence of significant shadowing, obscuring, or blocking of the C-band antenna array elements (104) caused by the presence of the first two antenna elements of the first array ($\mathbf{101}_1$ and $\mathbf{101}_2$) (and, to a lesser extent, blocking of the C-band antenna array caused by the second array). The far-field radiation pattern produced by the C-band array may be non-ideal and may have pattern distortions caused by the blocking effects.

The disturbance to the radiation pattern may be caused by scattering and reflections from the presence of the blocking structures, such as the low-band elements. It is also worth noting that these blocking structures may typically be at distances considered to be in the radiative far field of the C-band elements. Scattered component waves may interact with each other and also interact with the source radiated waves. This interaction of component waves may result in different vector sum phase combinations at different angles of azimuth and elevation in the far field, causing unwanted peaks and dips in the far field radiation pattern for each element, which also means possible undesired radiation patterns for the whole C-band array of elements when driven by beamforming. The C-band frequency radiated wave which is incident onto the low-band element dipoles can also be incident onto other components of the low-band antenna element, such as the feed structure (which would be perpendicular to the dipoles and not visible in FIG. 1), but can mean other components of the low-band antenna element also behave as additional scattering surfaces. The low-band antenna element component structures may also induce C-band currents and cause higher harmonic resonant modes, and may result in some re-radiation of C-band component RF energy.

A second problem illustrated by FIG. 1 is that the elements of the second array ($\mathbf{102}_1$-$\mathbf{102}_m$, $\mathbf{103}_1$-$\mathbf{103}_m$) are also partially obscured or blocked by the elements of the first array ($\mathbf{101}_2$-$\mathbf{101}_l$). This blocking is a more general problem associated with many multi-array BSA designs and is not dependent on BSA having a C-band array, for example. The second antenna array is designed for the radiation of signals in bands of approximately twice the frequency of the low-band array. This means for most BSA designs, the distances between low-band element structures and the mid-band element structures are typically within the reactive near-field of each other, or at most within the radiative near-field of each other. Instead of reflections being a dominant mechanism, blocking in the context between low-band and mid-band elements means that there can be more of a modified current distribution in the vicinity of the mid-band elements due to induced fields or strong mutual coupling from mid-band elements to low-band elements. Induced mid-band currents onto the low-band dipole arms may result in modified current distribution of mid-band frequencies and may result in a disturbed far field radiation pattern.

Figure 2B:
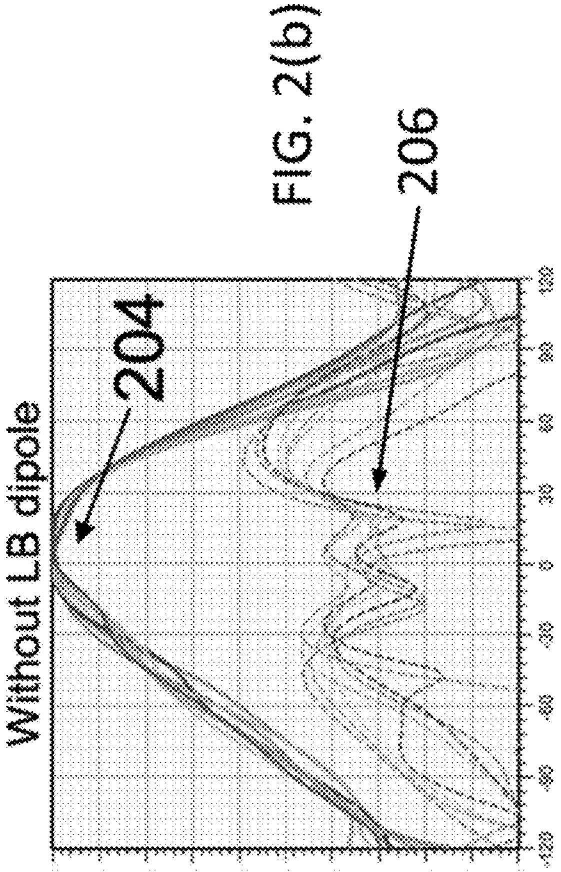
FIG. 2(*a*) depicts an example unit cell with a low-band cross-polarized antenna element and four mid-band cross-polarized antenna element configuration.
Figure 2C:
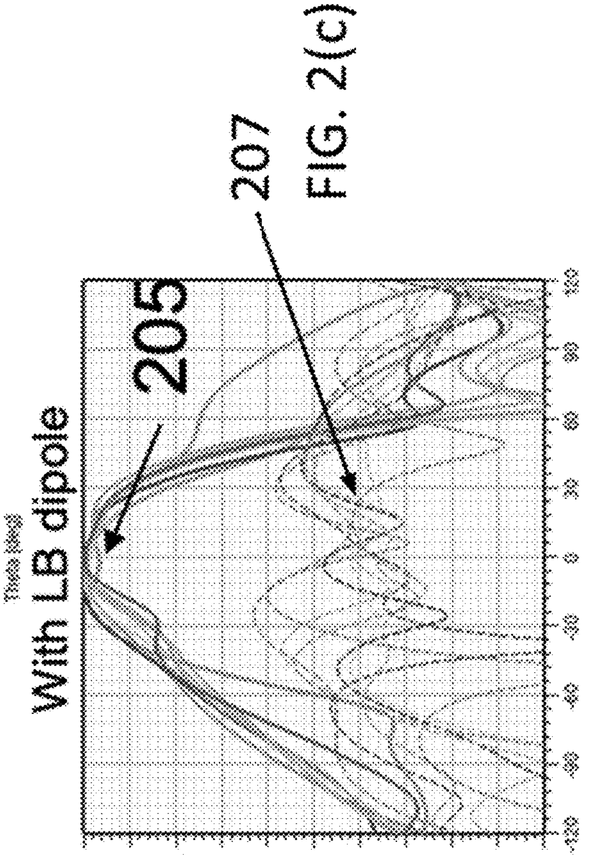
Figure 2A:
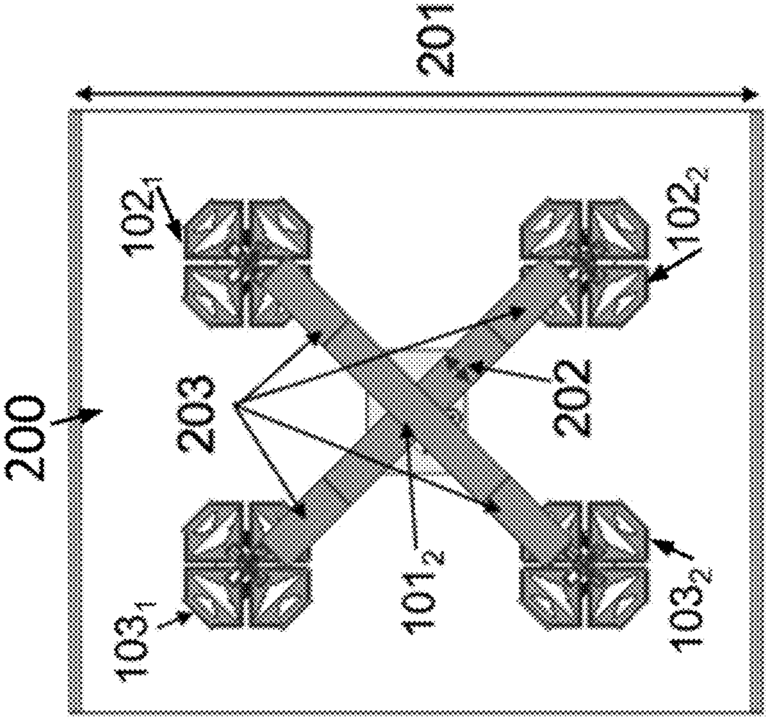

FIG. 2(*a*) shows a unit cell 200 (with length 201) comprising a dual-polarized crossed dipole antenna element ($\mathbf{101}_2$) for operation in a first band of frequencies, such as a low-band frequency range, with each of the two dipoles orthogonally crossed and oriented at +45° and −45° angles. This crossed dipole antenna element ($\mathbf{101}_2$) is positioned centrally in the unit cell (200), surrounded by four crossed dipole antenna elements ($\mathbf{102}_1$, $\mathbf{102}_2$, $\mathbf{103}_1$, $\mathbf{103}_2$) for operation in a second band of spectra, such as a mid-band frequency range, with each of these dipoles orthogonally crossed and oriented at +45° and −45° angles. Due to typical BSA frequencies of operation, the crossed dipole antenna element ($\mathbf{101}_2$) for operation in a first band of frequencies is typically twice the size of each of the crossed dipole antenna elements ($\mathbf{102}_1$, $\mathbf{102}_2$, $\mathbf{103}_1$, $\mathbf{103}_2$) for operation in a second band of frequencies. The crossed dipole antenna element ($\mathbf{101}_2$) has dipole arms (203) with a defined width (202).

In FIG. 2(*a*), mid-band antenna elements ($\mathbf{102}_1$, $\mathbf{102}_2$, $\mathbf{103}_1$, $\mathbf{103}_2$) are illustrated as being directly under the low-band dipole arms (203) in order to visually emphasize the blocking effect. However, it should be noted that other arrangements of the mid-band element positions are possible, for example where the mid-band antenna array is moved upwards by a distance equal to half of the inter-element spacing. This would place the mid-band elements between the low-band dipole arms and would result in less visual obscuring by the low-band dipole arms. However, the mid-band and low-band elements would remain at coupling distances within the reactive near field such that induction remains as a dominant coupling mechanism. Although not shown in FIG. 2, feed structures of low-band and mid-band elements such as baluns, may be located directly below the centers of the elements and may be disposed in a plane perpendicular to the plane of the elements. The feed structures for low-band and mid-band elements may also couple together, and more strongly in the case where the mid-band elements are placed in between the low-band dipole arms. Thus, it should be noted that mid-band and low-band elements may couple strongly regardless of precise positioning of the mid-band elements relative to the low-band elements.

Referring back to FIG. 2(*a*), when any of the mid-band elements ($\mathbf{102}_1$, $\mathbf{102}_2$, $\mathbf{103}_1$, $\mathbf{103}_2$) are radiating, a current on the low-band dipole arms (203) may be induced, since the low-band dipole arm (203) is within a distance for strong inductive coupling. This coupling of energy between the mid-band dipole arm to low-band dipole arms (203) may result in modified current distribution on the low-band dipole arms (203), in turn resulting in a disturbance to the far field radiation patterns. As the width (202) of the low-band dipole arms increases, more physical shadowing may occur, but may result in stronger coupling with each of the mid-band elements ($\mathbf{102}_1$, $\mathbf{102}_2$, $\mathbf{103}_1$, $\mathbf{103}_2$). The feed or balun structure of the low-band element is not shown in FIG. 2(*a*), but would reside below the center of the low-band element disposed in plane perpendicular to the plane of the elements. This balun structure can also be a source of pattern disturbance of the mid-band element far field radiation pattern.

FIG. 2(*b*) shows the far field co-polarized radiation patterns (204 solid lines) and cross-polar radiation patterns (206 dotted lines) for a range of mid-band frequencies of one of the mid-band elements without the presence of the low-band element dipole arms (203) (and hence without the associated coupling). The far field radiation pattern has a smooth response as a function of azimuth angle and a low cross-polar energy component over the range of angles which would serve a cellular sector footprint for a three sector cellular site which are the azimuth angles from −60° to +60°. FIG. 2(*c*) shows the corresponding degraded far field co-polarized radiation patterns (205 solid lines) and cross-polarized radiation patterns (207 dotted lines) from energizing the partially obscured mid-band dipoles of mid-band antenna element ($\mathbf{103}_1$), as a result of the coupling interaction between low-band and mid-band elements. Generally, pattern degradation deteriorates further as antenna element coupling becomes stronger, as would be the case if mid-band and low-band elements were to be packed more closely to each other.

A frequency selective surface (FSS) is a two-dimensional thin periodic arrangement of an array of FSS elements. These FSS elements can be configured to either reflect, re-radiate, or absorb RF power when the frequency of a plane wave matches the resonance frequency of the FSS elements. Periodic FSS array structures can be designed to be radiating or non-radiating, therefore functioning as a spatial filter. In practice, several FSS element periods may be required for nominal operation of the FSS. Truncation of the FSS after a limited number of periods can have an impact to the effectiveness of the FSS. The FSS element can be treated as a resonance circuit when it is illuminated by incident plane waves. The resonant frequency may be determined by the formula $f=1/(2\pi\sqrt{LC})$, where L and C represent equivalent inductance and capacitance of the element, respectively.

Etching of FSS structures has previously been implemented on the radiating portions of antenna elements, and has been used to permit the conduction and the radiation of RF signals at frequencies of operation of the antenna element constructed through the FSS as a transmission line, while allowing the FSS to become resonant for re-radiating a second higher frequency; thus, the antenna element becomes electrically transparent at a second higher frequency due to the spatial filter effect of the FSS. Such an arrangement allows a second radiation source to radiate at the higher frequency with little or no attenuation through the first antenna element constructed using the FSS.

In one example, the present disclosure provides for the use of FSS structures with split ring or hexagon FSS elements, which increases the number of FSS periods over a finite size of the radiating portions of the antenna element. Such radiating portions of the antenna element can include the dipole arms, which may need to be of certain dimensions for operation at the intended frequency range for the antenna element. FSS elements using split ring or split hexagon slots exploit a closed loop or closed perimeter for supporting resonance, and hence achieve a significant reduction in the overall size of the FSS elements. Closed loop geometries have a path for induced currents which are doubled via the loop perimeter of the slot, to enable lower resonant frequency modes. Using an array of split ring or split hexagon slotted FSS elements for the conducting and radiating portions of an antenna element, the band pass frequency of the FSS can be reduced, relative to having not used split ring or split hexagon slotted FSS element geometries.

Example 1

In an illustrative example, a plurality of periods of FSS elements are used for supporting the conduction and radiation of an RF signal in at least the radiating portions of at least one antenna element of a first array of a plurality of antenna elements, where the antenna elements are designed for operation in a first range of frequencies, such as a low-band frequency range, and where the FSS utilizes a split ring, split hexagon slotted FSS element, or other closed-loop resonant FSS element geometry. The radiating portions of the low-band antenna element may include at least the dipole arms, but may also include any feed arrangement or balun network connecting to the dipole arms as well. An FSS utilizing the split ring or split hexagon slotted FSS elements is designed to be electrically transparent to an incident planar wavefront at a second frequency band, such as a C-band range of frequencies. This use of compact FSS elements allows a maximum number of periods of FSS elements to be accommodated on the components of the low-band antenna elements to optimize FSS band pass performance.

Figure 3B:
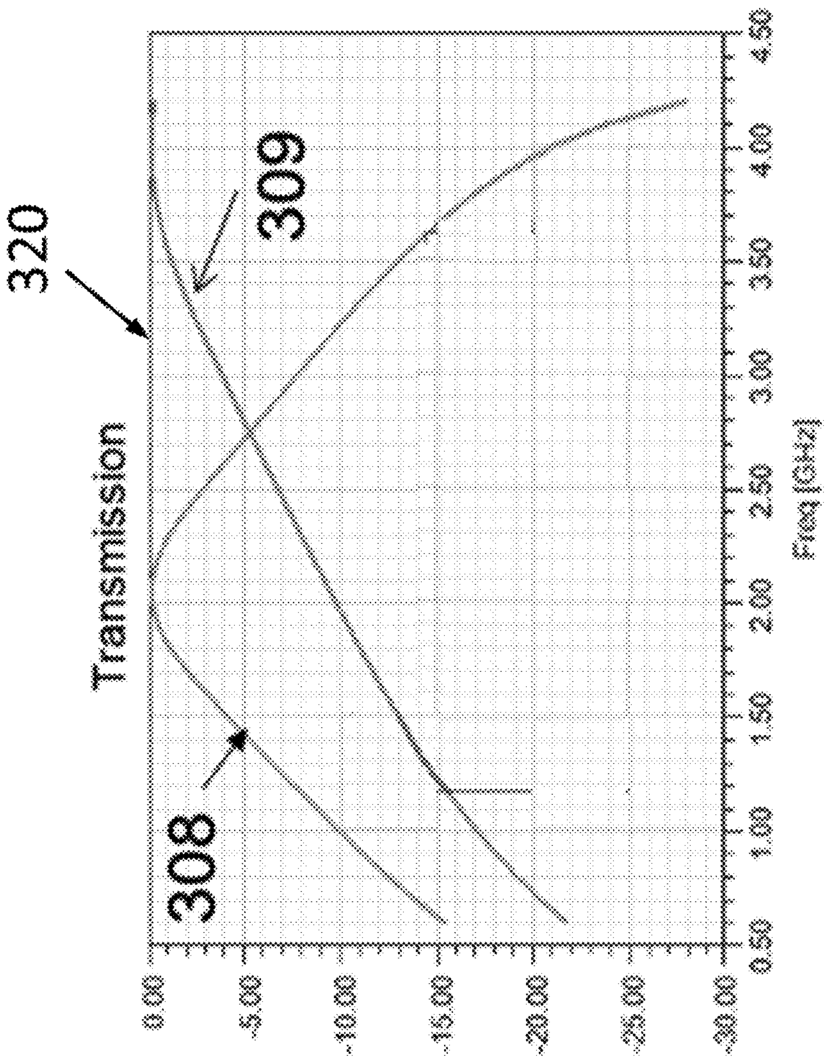
FIG. 3(*a*) depicts a composition of an example single FSS element.
Figure 3A:
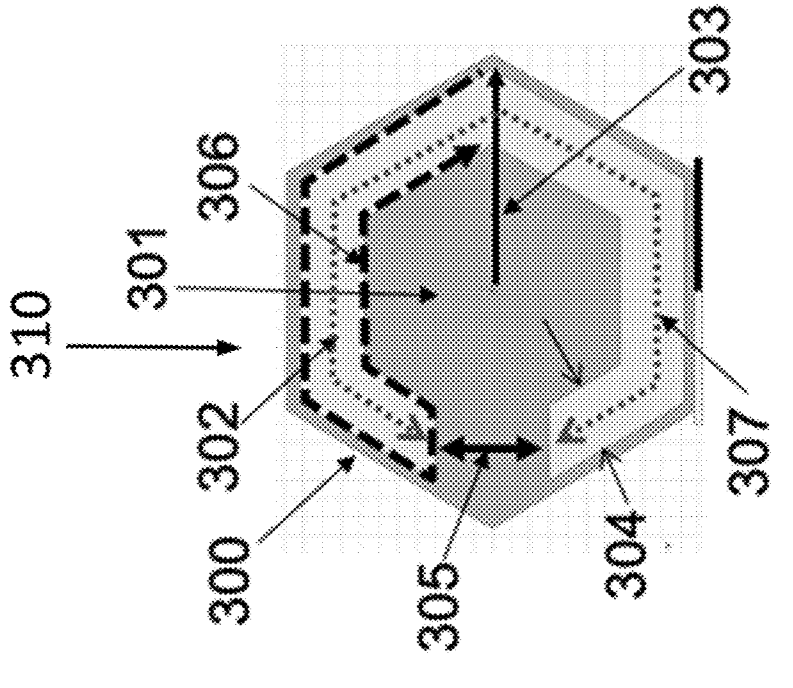

FIG. 3(*a*) shows an example of a single FSS element (310), where a shaded hexagonal area (301) may comprise a conductive copper layer with a hexagonal slot (302) etched therein, having a radius (303) and a slot gap of width (304). The region between the ends of the hexagonal shaped slot represents the split portion of the hexagonal slot with a slot split width (305). The FSS element (310) may be resonant when the length of the current path denoted by the dotted line (306) is approximately half of the wavelength of the frequency of the incident RF plane wave. This current path length (306) may be a function of the slot perimeter or loop length, which is a function of the slot gap width (304), slot length (307), slot split width (305), and the hexagonal element radius (303) of the FSS element (310). Induced currents from an incident wavefront parallel to the same plane of the FSS element (310) may flow along the outer edge of the slot from one end to the other, and then return via the inner edge of the slot. This looped current flow behaviour maximizes the length of the current path, hence reducing the resonant frequency of the FSS.

FIG. 3(*b*) depicts a graph (320) of transmissivity characteristics of a plane wave on the FSS as a function of frequency, the plane wave having a wavefront in the same plane as the FSS element plane, and the wavefront traveling in a direction perpendicular to the plane of the FSS element of FIG. 3(*a*). In FIG. 3(*b*), a resonance band-pass frequency is shown at around 2 GHz, illustrated by transmissivity curve (308), which is achieved when length (306) is around half the wavelength through tuning of dimensions (303, 304, and 305). The precise dimensions of these parameters are not provided, insofar as FIGS. 3(*a*) and 3(*b*) are merely illustrative in order to demonstrate that resonance can be achieved. This means that a wavefront with a frequency of 2 GHz frequency can be transmitted through this FSS element (310) with little or no attenuation. If the path length (306) is halved through tuning of dimensions of (303, 304, 305, and/or 307), then resonance can be achieved at around 4 GHz, as shown by curve (309) in FIG. 3(*b*). The frequency at which the FSS becomes resonant makes the FSS re-radiate any incident wave, and essentially appear invisible to the incident wavefront of the same frequency, which may be referred to as the cloaking frequency.

The size of an FSS element using slotted geometries is relatively small compared to free space wavelength. Although FIG. 3(*a*) shows a single FSS element, in order to achieve stable resonance at varying angles of incidence of a plane wave, an FSS structure may use several elements or periods configured in an array of elements. To further reducing the resonance or cloaking frequency of the FSS, a periodic arrangement of FSS elements placed in a close tessellated formation may be used to increase inter-element capacitance. In one example, a hexagonal slotted geometry for the FSS element may be used for increasing FSS element packing density and inter-element capacitance.

In one example, insofar as FSS elements/structures may be used as the radiating portions of a low-band antenna element, these radiating components may be composed to be sufficiently conductive at the intended operating frequency of the low-band antenna element to ensure that the currents can flow effectively over the FSS. For example, in the case where the low-band antenna element has dipole arms as the radiating portions, then the dipole arms constructed using an FSS structure should perform similarly to conventional dipole arms and ensure that there is proper antenna impedance match for radiation efficiency at the intended operating frequency for the low-band antenna element.

Figure 4A:
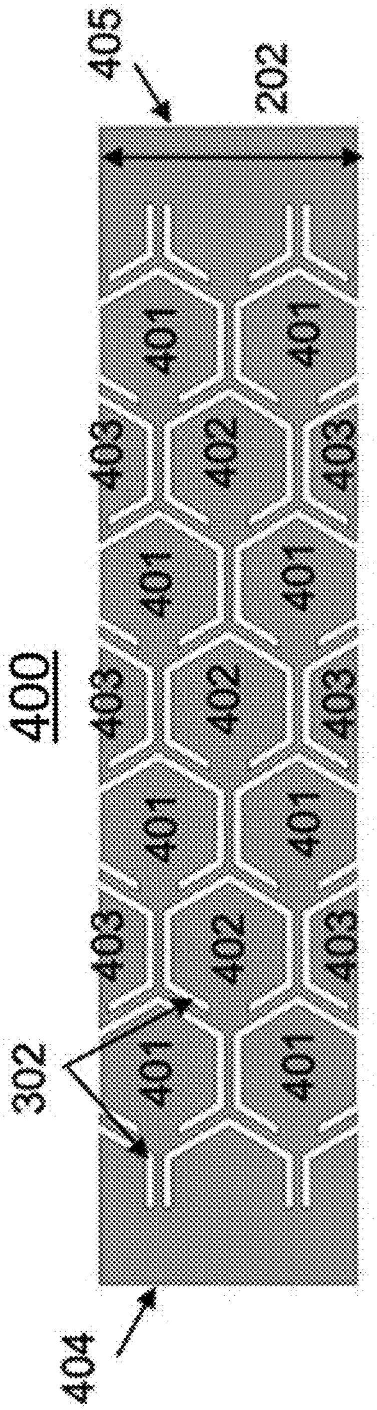
FIG. 4(*a*) depicts a composition of an example low-band dipole arm using an array of tessellated FSS elements.
Figure 4B:
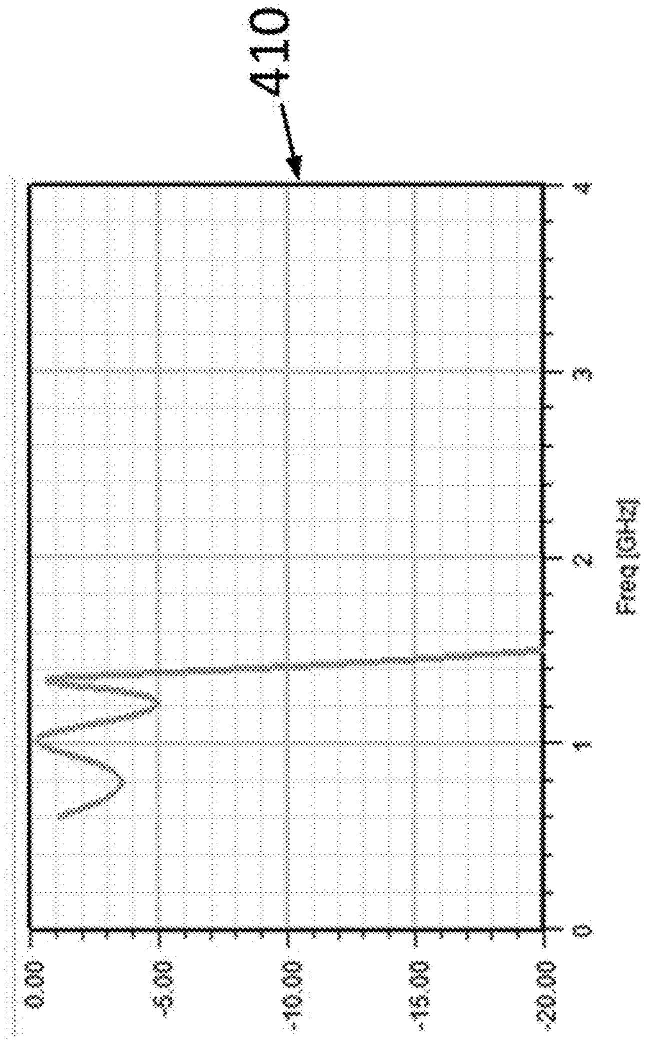

An FSS configured to support the conduction and radiation of RF signals on a dipole arm can be analyzed as a transmission line (e.g., with a width denoted by (202)). FIG. 4(*a*) depicts an array (400) of tessellated FSS elements (401, 402, 403) for analysis as a transmission line where each FSS element is comprised of a split hexagonal loop FSS structure. The number of FSS element periods along and across the transmission line can be varied, together with the choice between full hexagonal loop FSS elements (402) and different truncated hexagonal loop FSS elements (401, 403). In other words, the number of full and truncated elements may conform to a shape of the transmission line (e.g., a dipole arm). The transmission characteristics of an RF signal originating from the left position 404 and arriving at the right position 405 of the transmission line is analyzed and shown in the graph 410 of FIG. 4(*b*) as a function of frequency. This plot demonstrates that signals under about 1.4 GHz can be supported by the FSS as a transmission line, and any frequency above 1.5 GHz will experience significant attenuation. In other words, the array (400) may support an efficient transmission of signals under about 1.4 GHz as a transmission line (e.g., in one example, a loss of no more than 1.5 dB, in another example, a loss of no more than 3 dB, etc.), which is suitable for use in a cellular communication system. In general, having more FSS periods can improve overall conductivity and radiation efficiency for the dipole arms as well.

Referring again to FIG. 4(*a*), it should be noted that in one example, it may be desirable to maximize the number of FSS element periods across the width (202) of the transmission line, regardless of whether incomplete elements result from such tessellation. In one example, slot gap width, slot length, slot split width, and/or element radius may be adjusted to minimize or avoid incomplete elements (such as (401)) while maintaining a desired element path length, or while balancing performance characteristics with a non-ideal path length against the performance characteristics with incomplete elements (such as (401)). Similarly, the width (202) may be varied to minimize or avoid incomplete elements (such as (401)). It should be noted that half elements (such as (403)) may still be present in such an array. However, with small adjustments, elements that are only slightly incomplete (such as (401)) may be avoided or minimized.

Figure 5B:
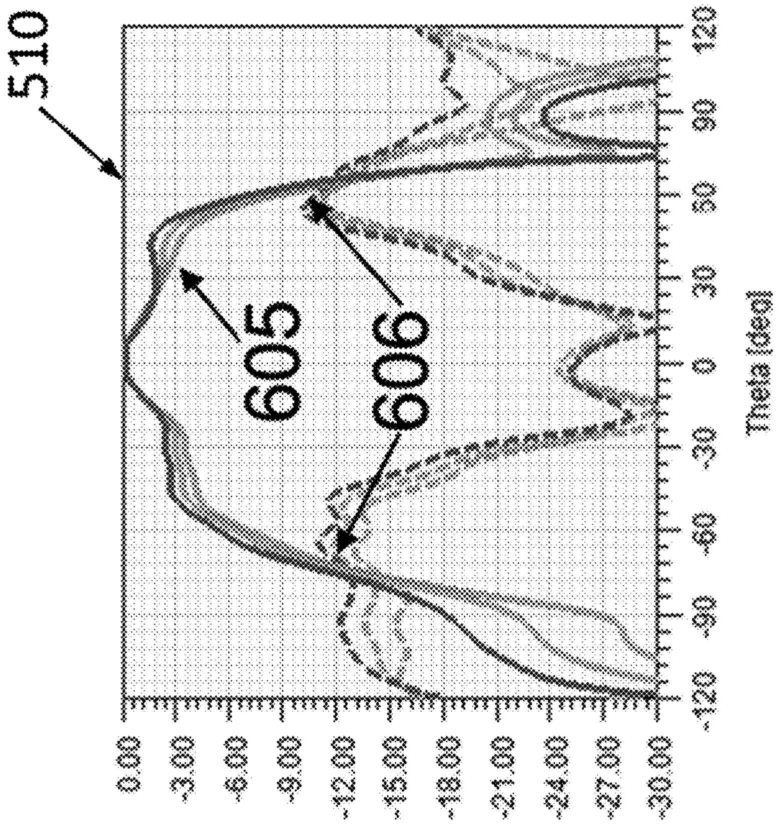
FIG. 5(*a*) depicts an example of a low-band dipole arm obscuring a C-band antenna element.
Figure 5A:
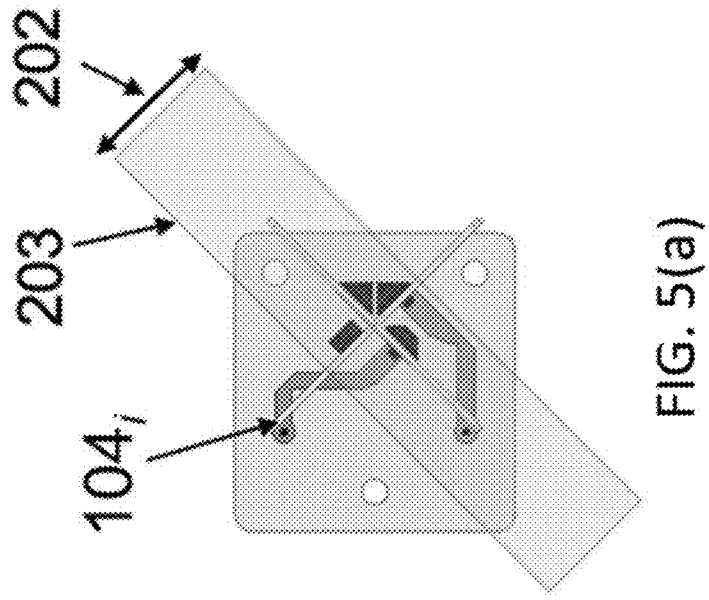

FIG. 5(*a*) illustrates a low-band dipole arm (203) as one of the radiating portions of an antenna element (e.g., ($101_1$) in FIG. 1) from a first array of antenna elements designed for operation in a first range of frequencies, such as a low-band range of frequencies from 698-894 MHz. The low-band dipole arm (203) may be constructed from a continuous copper plate having a dipole arm width denoted by dimension (202), where the low-band dipole arm (203) is placed above at least one dual-polarized antenna element ($104_i$) designed for operation in a higher range of frequencies. For instance, in this example, the antenna element ($104_i$) may be designed for operation in a C-band range of spectrum from 3300-4200 MHz. Although not shown in FIG. 5(*a*), the low-band dipole arm (203) and C-band antenna element ($104_i$) may share a common ground reflector plane, e.g., in a plane parallel to and below the low-band dipole arm (203) and C-band antenna element ($104_i$). For instance, the low-band dipole arm (203) and C-band antenna element ($104_i$) may each be positioned above the common reflection plane by approximately a quarter wavelength at each of their respective frequencies of operation. It can be shown that this geometric arrangement means that the low-band dipole arm (203) can be considered as being well within the radiative far field of the C-band antenna element ($104_i$).

FIG. 5(*b*) depicts a graph (510) the resultant co-polarized far field radiation pattern (605 by solid curves) and cross-polarized far field radiation pattern (606 by dotted curves) for the C-band antenna element ($104_i$) as a function of azimuthal angle for three frequencies within the C-band range of frequencies. The C-band antenna element ($104_i$) is a dual-polarized antenna element, where the dipoles aligned in the same polarization as the low-band dipole arm (203) are analyzed for maximum shadowing effect. FIG. 5(*b*) reveals there is some pattern variation or disturbance in the co-polar patterns (605) resulting in some pattern asymmetry which may impact performance for cellular service delivered using an array of such C-band antenna elements.

Figure 6A:
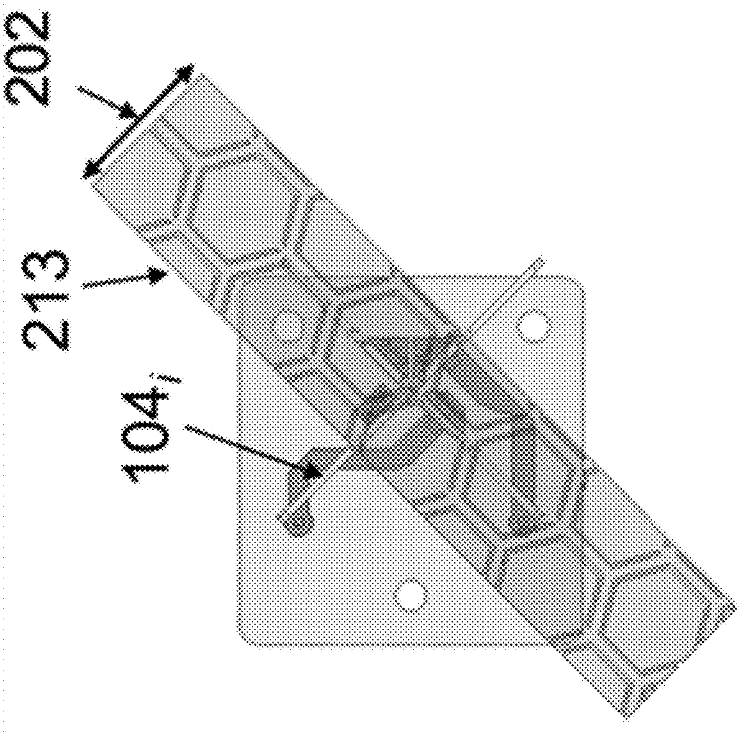
FIG. 6(*a*) depicts an example of a low-band dipole arm constructed with an FSS tuned to approximately 4 GHz and obscuring a C-band antenna element.
Figure 6B:
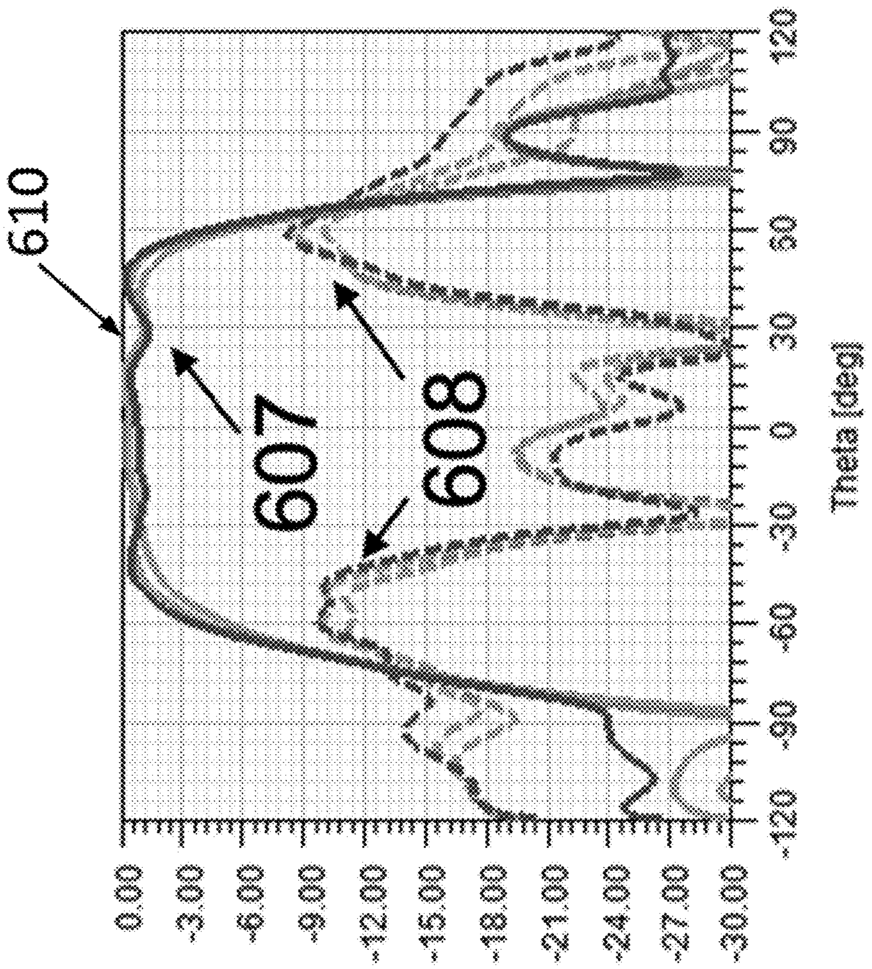

FIG. 6(*a*) depicts the equivalent or a similar arrangement as per FIG. 5(*a*), but where a low-band dipole arm (213) (having a dipole arm width denoted by dimension (202)) of an antenna element from a first array of antenna elements is constructed using a FSS comprising several periods of FSS elements along and across the low-band dipole arm (213) tuned to a cloaking frequency of just below 4 GHz for use with a C-band spectrum range of frequencies. Similar to the example of FIG. 5(*a*), the low-band dipole arm (213) is placed above at least one dual-polarized antenna element ($104_i$) designed for operation in a higher range of frequencies. The arrangement of FSS elements may also be configured to support the transmission and radiation of low-band RF signals by the low-band dipole arm (213) using the FSS, similar to that illustrated in FIG. 4(*a*). FIG. 6(*b*) depicts a graph (610) of the resultant co-polarized far field radiation pattern (607 by solid curves) and cross-polarized (608 by dotted curves) far field radiation pattern for the C-band antenna element ($104_i$), as a function of azimuthal angle for three frequencies within the C-band range of frequencies. FIG. 6(*b*) reveals reduced pattern variation or disturbance in the co-polar patterns (607) relative to FIG. 5(*b*). In particular, there is improved preservation of pattern symmetry, and there is much less attenuation over the range of angles which would serve a typical sector of a three-sector cellular site (e.g., angles of −60° to +60° from a boresight, or main beam center direction). Notably, these pattern attributes may be desirable features for a C-band range of frequencies for cellular networks.

For illustrative purposes, the dipole arms 203 and 213 of FIGS. 5(*a*) and 6(*a*) are associated with a low-band antenna array. However, the present examples apply equally to other types of resonant radiating antenna elements such as patch antennas. Additionally, an FSS element based on a split hexagonal slot structure is illustrated in FIG. 3(*a*). However, further examples of the present disclosure may include a wider family of slotted FSS elements, such as split rings, and more generally FSS element families designed to increase resonance wavelength.

Example 2

As noted above, FIGS. 4(*a*) and 4(*b*) illustrate that an array of FSS elements can be arranged to support the efficient transmission of RF signals below 1.4 GHz. The transmission plot of FIG. 4(*b*) also reveals that as a transmission line, the array would not support any current above 1.5 GHz (e.g., the array rejects coupling above 1.5 GHz, e.g., a loss of at least 20 dB or more, 30 dB or more, etc.). In one example, this property of the FSS is used for a second mode of operation, e.g., for frequency or band rejection for any RF signals which are closely coupled with a low-band antenna element utilizing the FSS structure. For instance, the present example may address antenna elements designed for different bands of frequencies that are in close proximity to each other and that present a risk of mutually coupling with each other so as to cause disturbances in the current distributions across the antenna elements and the resulting far field radiation patterns.

In one example, a plurality of periods of FSS elements in an FSS structure/array are used for supporting the conduction of an RF signal in at least the radiating portions of at least one antenna element of a first array of a plurality of antenna elements, where the antenna elements are designed for operation in a first range of frequencies such as a low-band range of frequencies, and where the FSS utilizes a split ring or split hexagon slotted FSS element geometry. As in the above-described examples, the radiating portions of a low-band antenna element may include the dipole arms, but may also include any feed arrangement or balun network connecting to the dipole arms as well. An FSS utilizing split ring or split hexagon slotted FSS elements may provide frequency band rejection at a second frequency by using a second mode of the FSS to significantly attenuate the transmission and re-radiation of RF energy at the second frequency via the FSS (e.g., a loss of at least 20 dB or more, 30 dB or more, etc.). For instance, the RF energy at the second frequency may be generated by at least one antenna element of a second array of antenna elements designed for operation in a second frequency band, such as a mid-band range of frequencies (e.g., 1695-2690 MHz or the like) and where the RF energy is incident to the antenna elements of the first array using FSS structures/arrays. Incident RF energy in this context can include RF energy from a planar wavefront, near field radiative regions of an antenna element of the second array of antenna elements, or near field reactive regions of an antenna element of the second array of antenna elements.

Figure 7B:
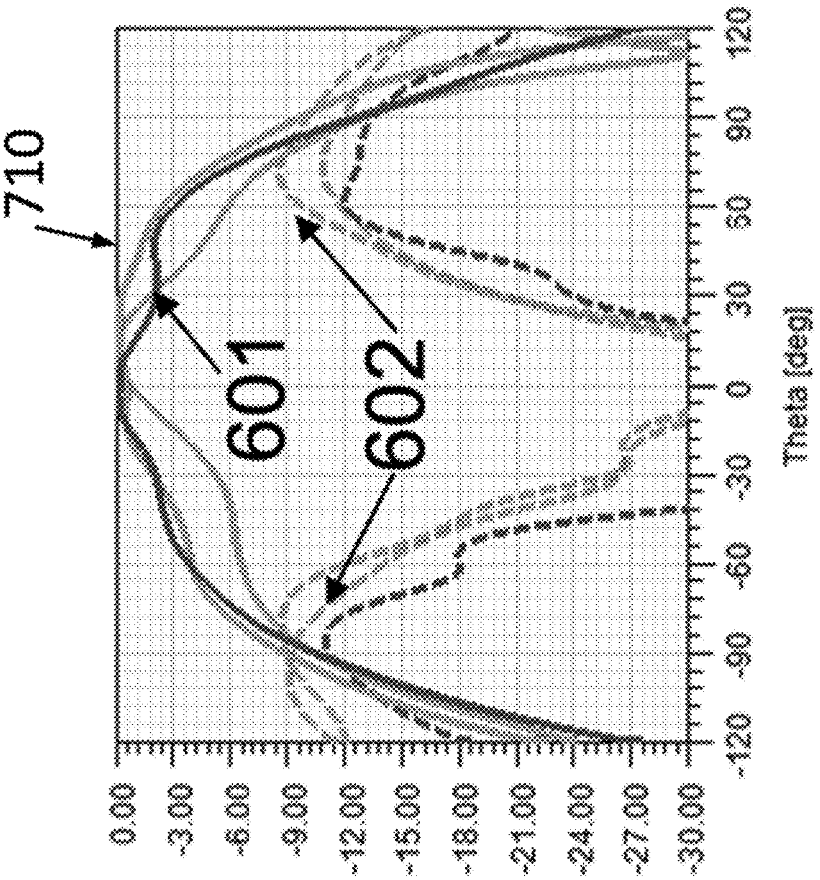
FIG. 7(*a*) depicts an example of a low-band dipole arm obscuring a mid-band antenna element.
Figure 7A:
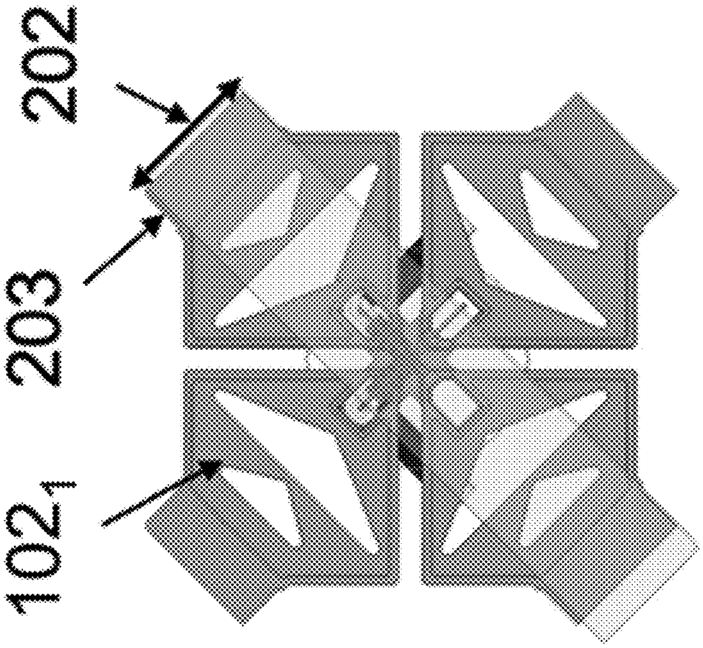

FIG. 7(*a*) illustrates a low-band dipole arm (203) as one of the radiating portions of an antenna element (e.g., ($\mathbf{101}_1$) in FIG. 1) from a first array of antenna elements for operation in a first range of frequencies, such as a low-band range of frequencies from 698-894 MHz. The low-band dipole arm (203) may be comprised of a continuous copper plate having a low-band dipole arm width denoted by dimension (202), where the low-band dipole arm (203) is placed above an antenna element ($\mathbf{102}_1$) of the second array of antenna elements for operation in a higher range of frequencies. For instance, in this example, the antenna element ($\mathbf{102}_1$) may be designed for operation in a second range of frequencies such as a mid-band range from 1695-2690 MHz. Although not shown in FIG. 7(*a*), the low-band dipole arm (203) and mid-band antenna element ($\mathbf{102}_1$) may share a common ground reflector plane, e.g., in a plane parallel to and below the low-band dipole arm (203) and mid-band antenna element ($\mathbf{102}_1$). The low-band dipole arm (203) and mid-band antenna element ($\mathbf{102}_1$) may each be positioned above the common reflection plane by approximately a quarter wavelength at each of their respective frequencies of operation. In this geometric arrangement, the low-band dipole arm (203) and mid-band antenna element ($\mathbf{102}_1$) may be considered as being within the radiative near field, or possibly within the reactive near field of the mid-band antenna element ($\mathbf{102}_1$).

FIG. 7(*b*) depicts a graph 710 of a resultant co-polarized far field radiation pattern (601 by solid curves) and cross-polarized far field radiation pattern (602 by dotted curves) for the mid-band antenna element ($\mathbf{102}_1$). The radiation pattern is shown as a function of azimuthal angle, across three frequencies within the mid-band range of frequencies. The low-band dipole arm (203) is aligned in the same polarization as the energized mid-band antenna element dipoles to give maximum shadowing effect. Although the radiation patterns are not shown for the case with for the unobstructed antenna element ($\mathbf{102}_1$), FIG. 7(*b*) does reveal there are frequency dependent pattern variations in the co-polar patterns and some overall pattern asymmetry. FIG. 7(*b*) also indicates a heightened level of cross-polar power component, especially towards sector edges of any tri-sectored cellular base station site using an array of such antenna elements, which can result in sub-optimal cellular network performance. The pattern distortions and increased cross-polar power may be due to the presence of the low-band dipole arm (203) inducing currents from incident RF energy from the mid-band antenna element ($\mathbf{102}_1$) onto the low-band dipole arm (203) and ultimately re-radiating component RF energy at the mid-band frequencies with a current distribution, which may have complex and multiple current peaks and nulls due to the fact the low-band dipole arm may be tuned for wavelengths which are at least twice as long as the mid-band wavelengths. This re-radiation of component RF energy may combine vectorially with RF energy radiating directly from the mid-band antenna element ($\mathbf{102}_1$), which may also result in rippling of the azimuth radiation pattern as a function of azimuth angle and frequency.

Figure 8B:
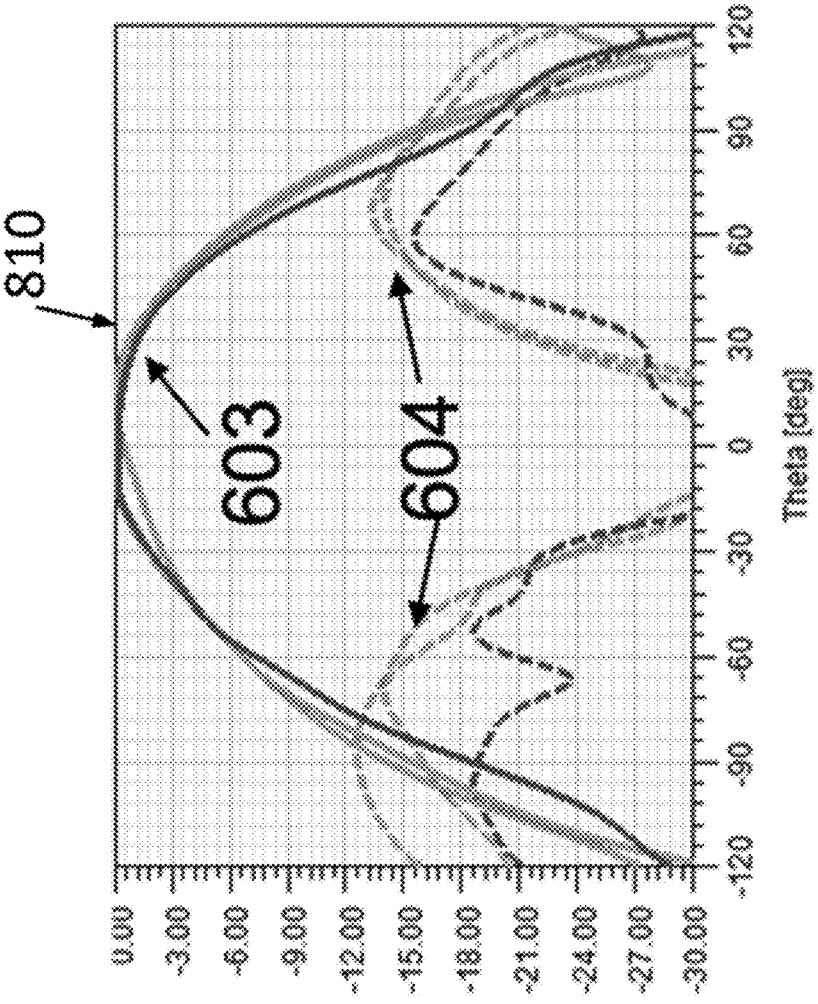
FIG. 8(*a*) depicts an example low-band dipole arm constructed with an FSS tuned to reject coupling above approximately 1.5 GHz and obscuring a C-band antenna element.
Figure 8A:
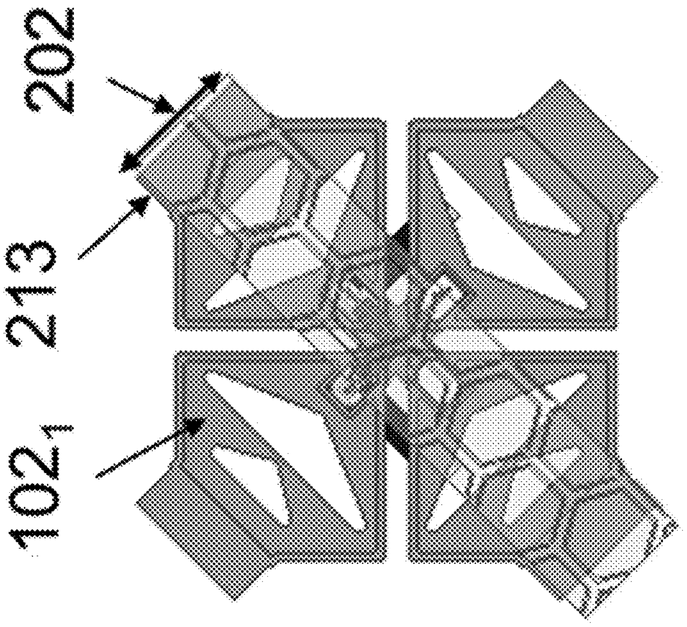

FIG. 8(*a*) depicts a similar or equivalent arrangement as per FIG. 7(*a*), but where the low-band dipole arm (213) (having a dipole arm width denoted by dimension (202)) is constructed using a FSS comprising several periods of FSS elements along and across the dipole arm (213) tuned to reject the coupling of RF energy (e.g., a loss of at least 20 dB or more, 30 dB or more, etc.) at frequencies in the mid-band range of frequencies utilizing the second mode of the FSS. Similar to the above examples, the low-band dipole arm (213) is placed above at least one dual-polarized antenna element ($\mathbf{102}_1$) designed for operation in a higher range of frequencies (e.g., a mid-band range of frequencies). The arrangement of FSS elements may also be configured to support the efficient transmission and radiation of low-band RF signals by the dipole arm (213) using the FSS, similar to the example of FIG. 4(*a*) (e.g., in one example, a loss of no more than 1.5 dB, in another example, a loss of no more than 3 dB, etc.). For instance, a change in the number of element periods across the width (202) from 1.5 to 2 may reduce the frequency cutoff by around 100-200 MHz. Increasing the length the array may also reduce the frequency cutoff (e.g., from 3 GHz to 2 GHz, to 1.5 GHz, and so forth) while at the same time the frequency roll-off may become sharper as the number of elements along the length increases (for arrays of the same width).

FIG. 8(*b*) depicts a graph (810) of the resultant co-polarized far field radiation pattern (603 by solid curves) and cross-polarized far field radiation pattern (604 by dotted curves) for the mid-band antenna element ($\mathbf{102}_1$). The radiation patterns are shown as functions of azimuthal angle, across three frequencies within the mid-band range of frequencies. FIG. 8(*b*) reveals much less pattern variation or disturbance in the co-polar patterns relative to FIG. 7(*b*). For example, there is improved preservation of pattern symmetry, there is less cross-polar power component, and there is less variation in pattern response over the three frequencies, which may be desirable attributes for a cellular antenna. In addition, there are minimal pattern distortions or increases in cross-polar power, which may be due to insignificant induced currents from incident RF energy from the mid-band antenna element ($\mathbf{102}_1$), onto the low-band dipole arm (213) as a result of utilizing the second mode of the FSS to minimize the re-radiating of component RF energy at mid-band frequencies from the low-band dipole arm. At worst there may be a small attenuation in the overall radiated RF power due to the physical blockage presented by the dipole arm (213), and absorption of some mid-band RF energy by the second mode of the FSS.

FIG. 7(*a*) and FIG. 8(*a*) depict geometric arrangements where the low-band dipole arms (203, 213) are directly in front of the mid-band element ($\mathbf{102_1}$). It should be noted that the low-band dipole arm (203) omits an FSS. While the low-band dipole arm (213) includes an FSS. It should also be noted that even if the mid-band antenna element ($\mathbf{102_1}$) was moved downwards in these Figures such that the low-band dipole arms (203, 213) were not directly in front of the respective mid-band element ($\mathbf{102_1}$), the mid-band element ($\mathbf{102_1}$) would remain in close proximity to the respective low-band antenna element (203, 213). As such there would still be risk of strong coupling and risk of component RF re-radiation from the low-band antenna element dipole arm (203) (in the case where FSS is not used on the dipole arm (203)).

Example 3

Figure 9A:
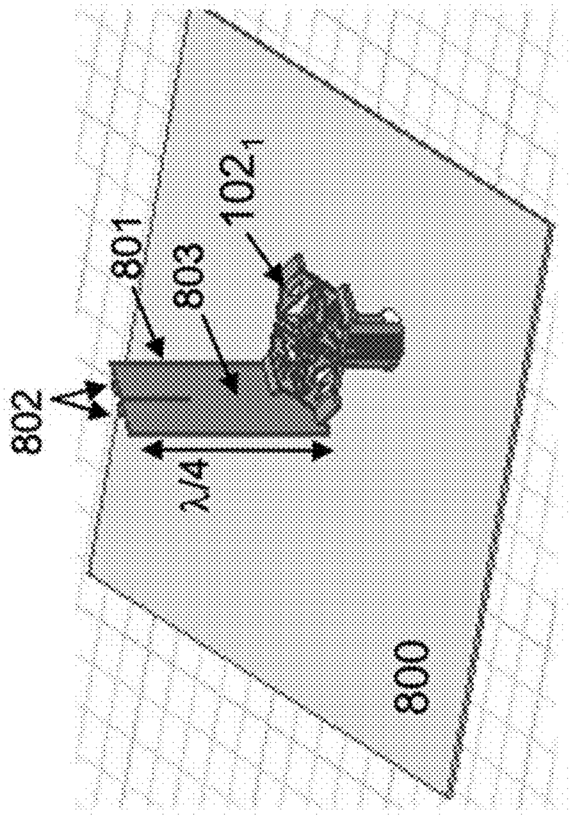
FIG. 9(*a*) depicts an example of a mid-band antenna element proximate to a low-band antenna element balun network with a continuous ground plane.
Figure 9B:
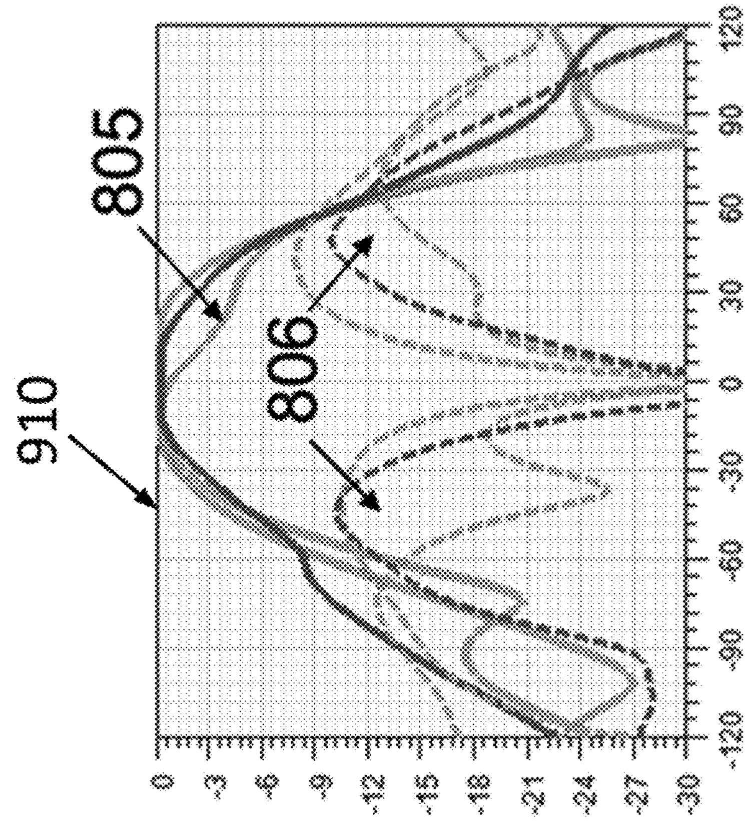

Dipoles are the primary radiating components of the low-band antenna elements in the above-described examples. In this regard, it is noted that antenna elements using dipoles may typically use a feed arrangement to optimally connect RF cables to the dipole arms. In one example, such feed networks perform a transformation of the RF signals from an unbalanced cable transmission line to a balanced dipole transmission line and are referred to as a balun (balanced-unbalanced) network. FIG. 9(*a*) illustrates a balun network (801) for one of two orthogonal polarized antenna elements. The balun network (801) may be around, or just less than, ¼ wavelength tall, where the top portion (802) of the balun network (801) connects to the two dipole arms of one of two mutually orthogonally polarized dipole arm pairs. The arms of the dipole are not shown in FIG. 9(*a*) for clarity. The balun (e.g., balun network (801)) may be comprised of a microstrip line which is also not shown in FIG. 9(*a*) but which would be on the opposite side of the visible portion of the balun network (801) in FIG. 9(*a*). This microstrip line may be parallel to a larger ground plane (803) which is visible in FIG. 9(*a*), and with which a transmission line is formed from the connecting cables to the dipole arms. The connecting cables are not shown in FIG. 9(*a*) but would connect to the balun network (801) below the common reflector plane (800). The balun network (801) and particularly the balun ground plane (803) of the low-band antenna element may also be a structure which couples with the mid-band antenna element ($\mathbf{102_1}$). Depending on the proximity of the mid-band element ($\mathbf{102_1}$), such coupling can include inductive coupling when the low-band antenna element balun network (801) is within the reactive near field of the mid-band antenna element ($\mathbf{102_1}$) for instance, or more generally when the low-band antenna element balun network (801) behaves as a reflecting or scattering surface for the RF radiated field from the mid-band antenna element ($\mathbf{102_1}$).

FIG. 9(*b*) illustrates a graph 910 of the radiation patterns as a function of azimuth angle for the mid-band antenna element ($\mathbf{102_1}$) as depicted in FIG. 9(*a*) and hence in the vicinity of the low-band antenna element balun network (801) (without its dipole arms). In particular, FIG. 9(*b*) shows the co-polarized patterns for three different frequencies across the range 1695 MHz and 2690 MHz within the mid-band range of frequencies (solid lines 805). FIG. 9(*b*) also shows the cross-polarized patterns for the same three different frequencies (dotted lines 806). It is observed that there are some frequency dependent pattern variations, and there is also a relatively large cross-polarized power component towards the sector edges (−60° and +60°) in the case where the antenna is used in a tri-sectored base station implementation.

In one example, the present disclosure may use a tuned FSS for the construction of balun networks, and particularly for the balun ground plane for the low-band antenna elements in a multi-array BSA. Advantageously, utilizing a tuned FSS for the balun ground plane exploits the second mode of the FSS so that there is negligible coupling from mid-band RF radiated energy to a low-band antenna element balun network ground plane. This in turn ensures there is minimal induction to, re-radiation from, scattering from, or reflection from the low-band antenna element balun network ground plane. The tuned FSS can be implemented with a split hexagonal FSS slot geometry onto the balun ground plane. A ground plane which has intentional discontinuities in the plane may be referred to as a defective ground plane (where such term does not imply a defect in performance, but simply refers to the fact that the ground plane is not homogenous).

Figure 10B:
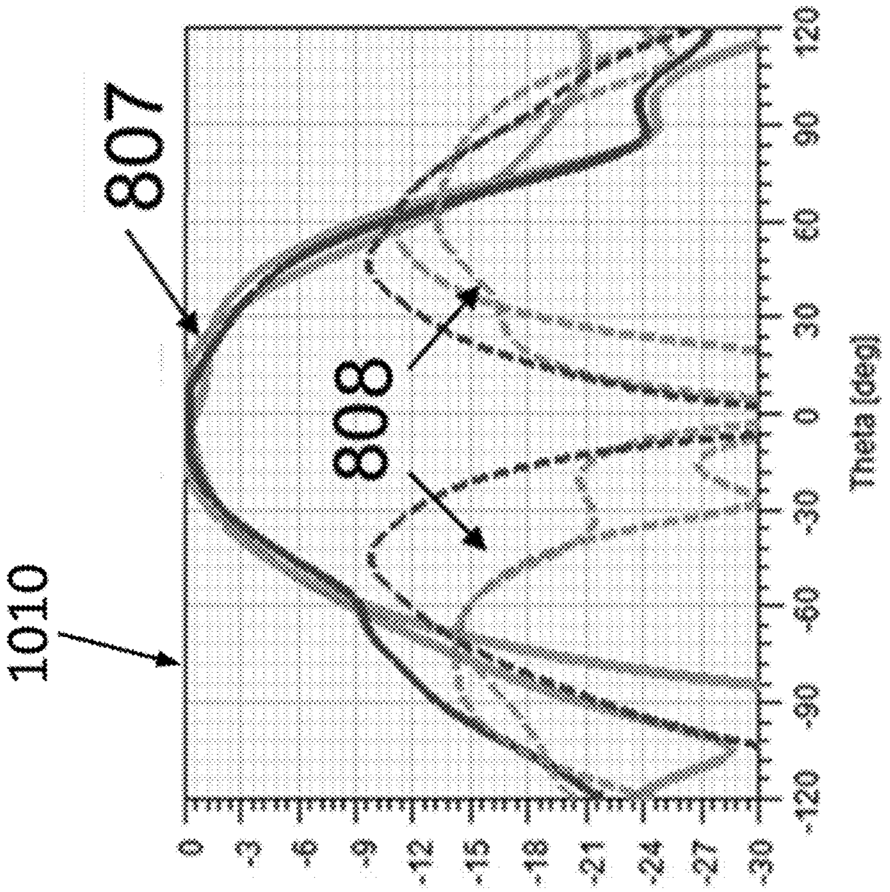
FIG. 10(*a*) depicts an example of a mid-band antenna element proximate to a low-band antenna element balun network with a defective ground plane comprising tuned FSS/array.
Figure 10A:
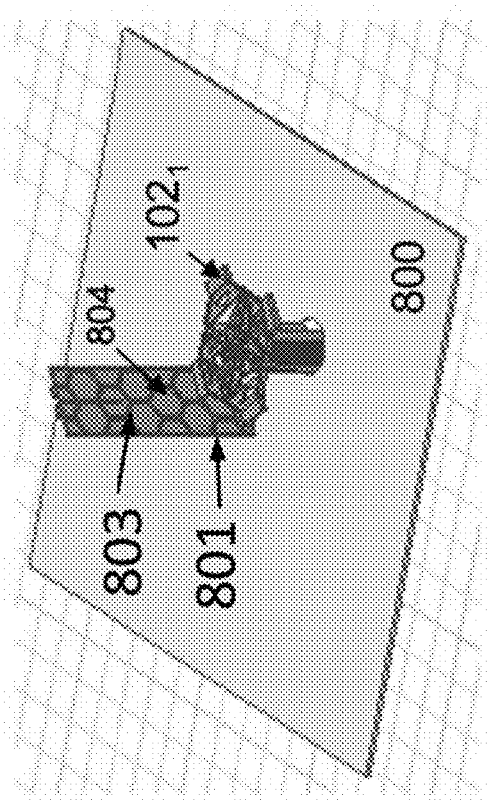

Similar to the above example, FIG. 10(*a*) depicts a configuration of mid-band antenna element ($\mathbf{102_1}$) in close proximity to a low-band antenna element balun network (801) as per FIG. 9(*a*), but where the balun network ground plane (803) is constructed using a FSS with a tessellated array of split hexagonal slot FSS elements (804). The FSS is tuned to exploit the second mode of the FSS where the FSS supports efficient transmission of low-band RF signals from RF cabling connections to the dipole arms, but also where the FSS ensures insignificant induced RF energy from the close-by mid-band antenna element (203), and hence minimal mid-band RF component power generated by reflections, scattering, or re-radiation from the balun ground plane (803).

FIG. 10(*b*) illustrates a graph 1010 of radiation patterns as a function of azimuth angle for mid-band antenna element (203) as per the arrangement depicted in FIG. 10(*a*) where the mid-band antenna element ($\mathbf{102_1}$) is in the vicinity of the low-band antenna element balun network (803) utilizing a tuned FSS exploiting the second mode of the FSS with a tessellated array of split hexagonal slot FSS elements (804). FIG. 10(*b*) shows the co-polarized patterns for three different frequencies across 1695 MHz and 2690 MHz within the mid-band range of frequencies (solid lines 807). In addition, FIG. 10(*b*) also shows the cross-polarized patterns for the same three different frequencies (dotted lines 808). Compared to the case for the non-FSS balun ground construction in FIG. 9(*b*), in FIG. 10(*b*) there is less frequency dependent pattern variation, and there is also a small improvement or reduction in cross-polarized power component towards the sector edges (−60° and +60°) in the case where the antenna is used in a tri-sectored base station implementation.

Example 4

In an additional example of the present disclosure, a tuned FSS may be used for the construction of the balun networks, and more specifically as a defective balun network ground plane for a low-band antenna element in a multi-band array (e.g., a BSA) exploiting the first (cloaking) mode of the FSS. Advantageously, utilizing a tuned FSS for the balun ground plane exploits the first mode of the FSS so that there is minimal scattering or reflections of C-band RF energy from the low-band antenna element balun network ground plane, as a result of the C-band antenna elements irradiating the low-band antenna element balun network. The tuned FSS may be configured to be resonant and re-radiate in the C-band range of frequencies, and can be implemented with FSS elements using a split hexagonal FSS slot structure onto the balun ground plane such that the balun ground plane appears transparent to any C-band radiation from the array of C-band antenna elements which are also in close proximity to the low-band antenna elements.

Example 5

In an additional example of the present disclosure, the first and second modes of the FSS may be simultaneously utilized in a triple band antenna with each band using at least one cross-polarized array of antenna elements and where the FSS structures may utilize slotted hexagon slot elements, and when FSS structures may be deployed onto at least the radiating components of the low-band antenna elements. In the present example, the first mode of the FSS may be utilized by tuning for a cloaking property at C-band frequencies, meaning that C-band radiation from C-band antenna elements is not blocked, reflected, or scattered by the larger low-band antenna elements in a dense multi-array BSA environment. The second mode of the FSS may be utilized by ensuring efficient low-loss transmission and radiation of low-band RF signals from the low-band antenna elements, while at the same time ensuring minimal induced currents onto the low-band antenna elements from nearby mid-band antenna elements. In other words, in the present example, split hexagon slotted FSS elements may be used for FSS structure which are tuned to exploit both the first and second modes such that mutual coupling and inter-actions of the antenna array is minimized in order to optimize antenna array performance and/or to allow a minimal distance between antenna elements designed for different bands.

In view of the foregoing, it should be noted that tuned FSS structures may be used on other BSA components to optimize radiation patterns, such as RF components including but not limited to fences, resonators, parasitic resonators, directors, etc. While the foregoing describes various examples in accordance with one or more aspects of the present disclosure, other and further example(s) in accordance with the one or more aspects of the present disclosure may be devised without departing from the scope thereof, which is determined by the claim(s) that follow and equivalents thereof.

Aspects of various embodiments are specified in the claims. Those and other aspects of various embodiments are specified in the following numbered clauses.

What is claimed is:

1. A multi-band antenna comprising:

a first antenna array for operation in a first frequency range; and a second antenna array for operation in a second frequency range, wherein the second frequency range is higher than the first frequency range;

wherein the first antenna array comprises at least one antenna element, wherein the at least one antenna element comprises a plurality of components, wherein at least one of the plurality of components is constructed with a frequency selective surface (FSS) comprising a plurality of FSS elements;

wherein the FSS is configured for the at least one of the plurality of components to provide a rejection of a coupling of energy from the second frequency range, and for the at least one of the plurality of components to provide a transmission of signals in the first frequency range suitable for use in a cellular communication system;

wherein at least a first subset of the plurality of FSS elements comprises complete FSS elements, wherein each of the complete FSS elements comprises a slotted aperture etched into a conductive surface around a perimeter of the complete FSS element, and where the slotted aperture forms an incomplete hexagon shape or an incomplete ring shape, with a total internal perimeter of the slotted aperture being a wavelength of a resonance wavelength in a third frequency range.

2. The multi-band antenna of claim 1, wherein the rejection of the coupling of the energy from the second frequency range comprises a loss of at least 20 dB.

3. The multi-band antenna of claim 1, wherein the transmission of the signals in the first frequency range suitable for use in the cellular communication system comprises a loss of no more than 3 dB.

4. The multi-band antenna of claim 1, where the plurality of FSS elements is tessellated into an array, wherein the array comprises the at least the first subset of the plurality of FSS elements and at least a second subset of the plurality of FSS elements, and wherein the at least the second subset of the plurality of FSS elements comprises truncated FSS elements to conform to a shape of the at least one of the plurality of components.

5. The multi-band antenna of claim 1, wherein the plurality of components comprises at least one component for radiating radio frequency (RF) energy.

6. The multi-band antenna of claim 1, wherein the first antenna array comprises a plurality of antenna elements, the plurality of antenna elements including the at least one antenna element.

7. The multi-band antenna of claim 1, further comprising:

a third antenna array for operation in the third frequency range, wherein the third frequency range is higher than the second frequency range; and wherein the FSS is further configured for the at least one of the plurality of components to provide the resonance wavelength in the third frequency range.

8. A multi-band antenna comprising:

a first antenna array for operation in a first frequency range; and a second antenna array for operation in a second frequency range, wherein the second frequency range is higher than the first frequency range;

wherein the first antenna array comprises at least one antenna element, wherein the at least one antenna element comprises a plurality of components, wherein at least one of the plurality of components is constructed with a frequency selective surface (FSS) comprising a plurality of FSS elements, wherein the plurality of components comprises at least one component for radiating radio frequency (RF) energy, wherein the plurality of components further comprises a balun feed network ground plane; and wherein the FSS is configured for the at least one of the plurality of components to provide a rejection of a coupling of energy from the second frequency range, and for the at least one of the plurality of components to provide a transmission of signals in the first frequency range suitable for use in a cellular communication system.

9. The multi-band antenna of claim 8, wherein the at least one of the plurality of components that is constructed with the FSS comprises at least one of:

the at least one component for radiating RF energy; or the balun feed network ground plane.

10. The multi-band antenna of claim 8, wherein the rejection of the coupling of the energy from the second frequency range comprises a loss of at least 20 dB.

11. The multi-band antenna of claim 8, wherein the transmission of the signals in the first frequency range suitable for use in the cellular communication system comprises a loss of no more than 3 dB.

12. The multi-band antenna of claim 8, wherein the first antenna array comprises a plurality of antenna elements, the plurality of antenna elements including the at least one antenna element.

13. A multi-band antenna comprising:

a first antenna array for operation in a first frequency range; and a second antenna array for operation in a second frequency range, wherein the second frequency range is higher than the first frequency range;

wherein the first antenna array comprises at least one antenna element, wherein the at least one antenna element comprises a plurality of components, wherein at least one of the plurality of components is constructed with a frequency selective surface (FSS) comprising a plurality of FSS elements;

wherein the plurality of FSS elements have features configured for the at least one of the plurality of components to provide a resonance wavelength in the second frequency range, and for the at least one of the plurality of components to provide a transmission of signals in the first frequency range suitable for use in a cellular communication system;

wherein at least a first subset of the plurality of FSS elements comprises complete FSS elements, wherein each of the complete FSS elements comprises a slotted aperture etched into a conductive surface around a perimeter of the complete FSS element, and where the slotted aperture forms an incomplete hexagon shape or an incomplete ring shape, with a total internal perimeter of the slotted aperture being a wavelength of the resonance wavelength.

14. The multi-band antenna of claim 13, wherein the transmission of the signals in the first frequency range suitable for use in the cellular communication system comprises a loss of no more than 3 dB.

15. The multi-band antenna of claim 13, where the plurality of FSS elements is tessellated into an array, wherein the array comprises the at least the first subset of the plurality of FSS elements and at least a second subset of the plurality of FSS elements, and wherein the at least the second subset of the plurality of FSS elements comprises truncated FSS elements to conform to a shape of the at least one of the plurality of components.

16. The multi-band antenna of claim 13, wherein the plurality of components comprises at least one component for radiating radio frequency (RF) energy.

17. The multi-band antenna of claim 13, wherein the first antenna array comprises a plurality of antenna elements, the plurality of antenna elements including the at least one antenna element.

18. The multi-band antenna of claim 13, further comprising:

a third antenna array for operation in a third frequency range, wherein the third frequency range is between the first frequency range and the second frequency range; and wherein the features of the plurality of FSS elements are further configured for the at least one of the plurality of components to provide a rejection of a coupling of energy from the third frequency range.

19. The multi-band antenna of claim 18, wherein the rejection of the coupling of the energy from the third frequency range comprises a loss of at least 20 dB.

20. A multi-band antenna comprising:

a first antenna array for operation in a first frequency range; and a second antenna array for operation in a second frequency range, wherein the second frequency range is higher than the first frequency range;

wherein the first antenna array comprises at least one antenna element, wherein the at least one antenna element comprises a plurality of components, wherein at least one of the plurality of components is constructed with a frequency selective surface (FSS) comprising a plurality of FSS elements, wherein the plurality of components comprises at least one component for radiating radio frequency (RF) energy, wherein the plurality of components further comprises a balun feed network ground plane;

wherein the plurality of FSS elements have features configured for the at least one of the plurality of components to provide a resonance wavelength in the second frequency range, and for the at least one of the plurality of components to provide a transmission of signals in the first frequency range suitable for use in a cellular communication system.

21. The multi-band antenna of claim 20, wherein the at least one of the plurality of components that is constructed with the FSS comprises at least one of:

the at least one component for radiating RF energy; or the balun feed network ground plane.

22. The multi-band antenna of claim 20, wherein the transmission of the signals in the first frequency range suitable for use in the cellular communication system comprises a loss of no more than 3 dB.

23. The multi-band antenna of claim 20, wherein the first antenna array comprises a plurality of antenna elements, the plurality of antenna elements including the at least one antenna element.

* * * * *